United States Patent
Pai et al.

(10) Patent No.: US 7,606,825 B1
(45) Date of Patent: Oct. 20, 2009

(54) METHOD AND APPARATUS FOR PRESENTING OBJECTS IN AN ARRANGED FASHION

(75) Inventors: Pramod Kulyadi Pai, Karnataka (IN); Steven S. Teng, Littleton, MA (US)

(73) Assignee: EMC Corporation, Hopkinton, MA (US)

( * ) Notice: Subject to any disclaimer, the term of this patent is extended or adjusted under 35 U.S.C. 154(b) by 289 days.

(21) Appl. No.: 11/478,958

(22) Filed: Jun. 29, 2006

(51) Int. Cl.
*G06F 17/30* (2006.01)

(52) U.S. Cl. .................. 707/102; 707/101; 707/100

(58) Field of Classification Search .................. None
See application file for complete search history.

(56) References Cited

U.S. PATENT DOCUMENTS

| | | | |
|---|---|---|---|
| 6,854,035 B2 * | 2/2005 | Dunham et al. ............. | 711/117 |
| 6,859,455 B1 * | 2/2005 | Yazdani et al. ............. | 370/392 |
| 7,171,624 B2 * | 1/2007 | Baldwin et al. ............. | 715/734 |
| 2003/0105771 A1 * | 6/2003 | Tiefenbrun et al. ..... | 707/103 R |
| 2006/0004715 A1 * | 1/2006 | Lock et al. ..................... | 707/3 |

* cited by examiner

*Primary Examiner*—Yicun Wu
(74) *Attorney, Agent, or Firm*—Chapin IP Law, LLC

(57) ABSTRACT

A method, apparatus and computer program product for presenting objects in an arranged fashion is presented. A group of objects is identified and a root of a tree structure for the group of objects is determined. An arrangement for grouping into subgroups objects from the group of objects is selected. A determination is made regarding whether at least a predetermined number of objects exist for forming the subgroups and when at least a predetermined number of objects exist then forming a next level of the tree structure according to the arrangement and when less than the predetermined number of objects exist then adding the objects as leaf nodes to the tree structure. The tree structure is displayed to the user.

19 Claims, 6 Drawing Sheets

METHOD AND APPARATUS FOR PRESENTING OBJECTS IN AN ARRANGED FASHION

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

The SAN is therefore an interconnection of manageable entities operative to provide mass data storage and retrieval services to a user community. The storage area network (SAN) includes a set of storage arrays for storing user data, and an interconnection of manageable entities for retrieving and updating the data in response to user requests.

SUMMARY

Management of a storage area network can be a challenge due to the complex network of resources in the storage area network. For example, resources in a storage area network typically include a multitude of storage area network resources (such as those in a path between a host resource and storage array) working in harmony so that a host resource of the storage area network can access data on behalf of requesting clients. Network managers that manage the network and corresponding resources can range from inexperienced users who have a rudimentary understanding of how to configure a storage area network to experienced users who perform such tasks on a daily basis.

Conventional mechanisms for managing networks or other environments where a large number of objects are utilized such as those explained above suffer from a variety of deficiencies. One such deficiency is that conventional mechanism allow a manager of the collection of the objects to view the objects but do not permit the display of the objects in a tree which the user can specify arrangement criteria for different levels of the tree such that an optimal representation of the collection of objects is provided to the manager.

Embodiments of the invention significantly overcome such deficiencies and provide mechanisms and techniques that provide a method and apparatus for presenting objects in an arranged fashion. More specifically, configurations of the present application include methods and apparatuses facilitating the display of objects in a user-defined tree style presentation model. As an example, according to one configuration, a storage area network (SAN) manager utilizes a graphical user interface that enables the SAN manager to view objects of the storage area network. The graphical user interface displays, to the SAN manager, a user-defined tree style presentation model representing the set of objects. The tree may include several levels, wherein each level may be arranged by certain criteria selected by the SAN manager. Different levels of the tree may use the same arrangement criteria as a prior level or may use different arrangement criteria than prior levels. A developer or administrator of a storage area network environment may desire to view various arrangements of storage devices within the SAN.

In a particular embodiment of a method of presenting objects in an arranged fashion, the method includes identifying a group of objects. The method further includes determining a root of a tree structure for the group of objects. The method also includes selecting an arrangement for grouping into subgroups objects from the group of objects. The method additionally includes determining whether at least a predetermined number of objects exist for forming the subgroups and when at least a predetermined number of objects exist then forming a next level of the tree structure according to the arrangement criteria selected by the manager and when less than the predetermined number of objects exist then adding the objects as leaf nodes to the tree structure.

Other embodiments include a computer readable medium having computer readable code thereon for presenting objects in an arranged fashion. The medium includes instructions for identifying a group of objects. The medium further includes instructions for determining a root of a tree structure for the group of objects and instructions for selecting an arrangement for grouping into subgroups objects from the group of objects. Additionally the computer readable medium includes instructions for determining whether at least a predetermined number of objects exist for forming the subgroups and when at least a predetermined number of objects exist then forming a next level of the tree structure according to the arrangement criteria selected by the manager and when less than the predetermined number of objects exist then adding the objects as leaf nodes to the tree structure.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method for presenting objects in an arranged fashion as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for presenting objects in an arranged fashion as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC Corporation of Hopkinton, Mass., USA.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Presented is a method and apparatus for generating tree style presentation model used when a large number of objects needs to be grouped together in an arranged fashion, with various types of grouping at each level of the tree. The tree style presentation model is referred to as an IArrangeable model. The IArrangeable model is built in a generic sense and contains no code of the actual grouping logic. The logic itself is contained within independent components (referred to as IArrangers or simply Arrangers) which implement the IArranger interface. The combination of the IArrangeable model and the IArranger implementing objects (Arrangers) provide the tree style presentation model.

Beginning from a root node, at each level an IArranger implementing object is inserted which constructs the subgroups based on the IArranger determination criteria, when a sufficient number of objects exists. If less than a predefined number of object exist, then no groups are constructed and the objects are added to the tree structure as leaf nodes.

By having different types of IArranger objects, (e.g., size, type, name etc.) the user, at each level of the tree, has an option of arrangement. The IArrangers by themselves provide the name of the group node, which allows for improved modularity. Once an arrangement is selected, the corresponding IArranger instance is selected and the tree rearranged after collapsing any existing arrangement. The tree collapsing is managed by the IArrangeable model and is completely transparent to the IArranger.

From the IArranger's perspective, the IArranger is given a set of objects that need to be grouped together. The IArranger then analyzes the set and constructs groups, if sufficient number of objects exist and returns the groups as a standard structure as defined by the IArrangeable model. Such an approach eliminates the need for the IArranger to preserve its state.

On initialization, the objects of the tree are stored simply as a list and none of the objects are analyzed and grouped. Its only when an arrangement is applied by specifying the appropriate IArranger that the tree gets initialized and this list replaced with the set of groups rather than the actual objects themselves. With this instantiation approach, the advantage is that only those groups that are being used are constructed, saving time during initialization.

Figure 1:
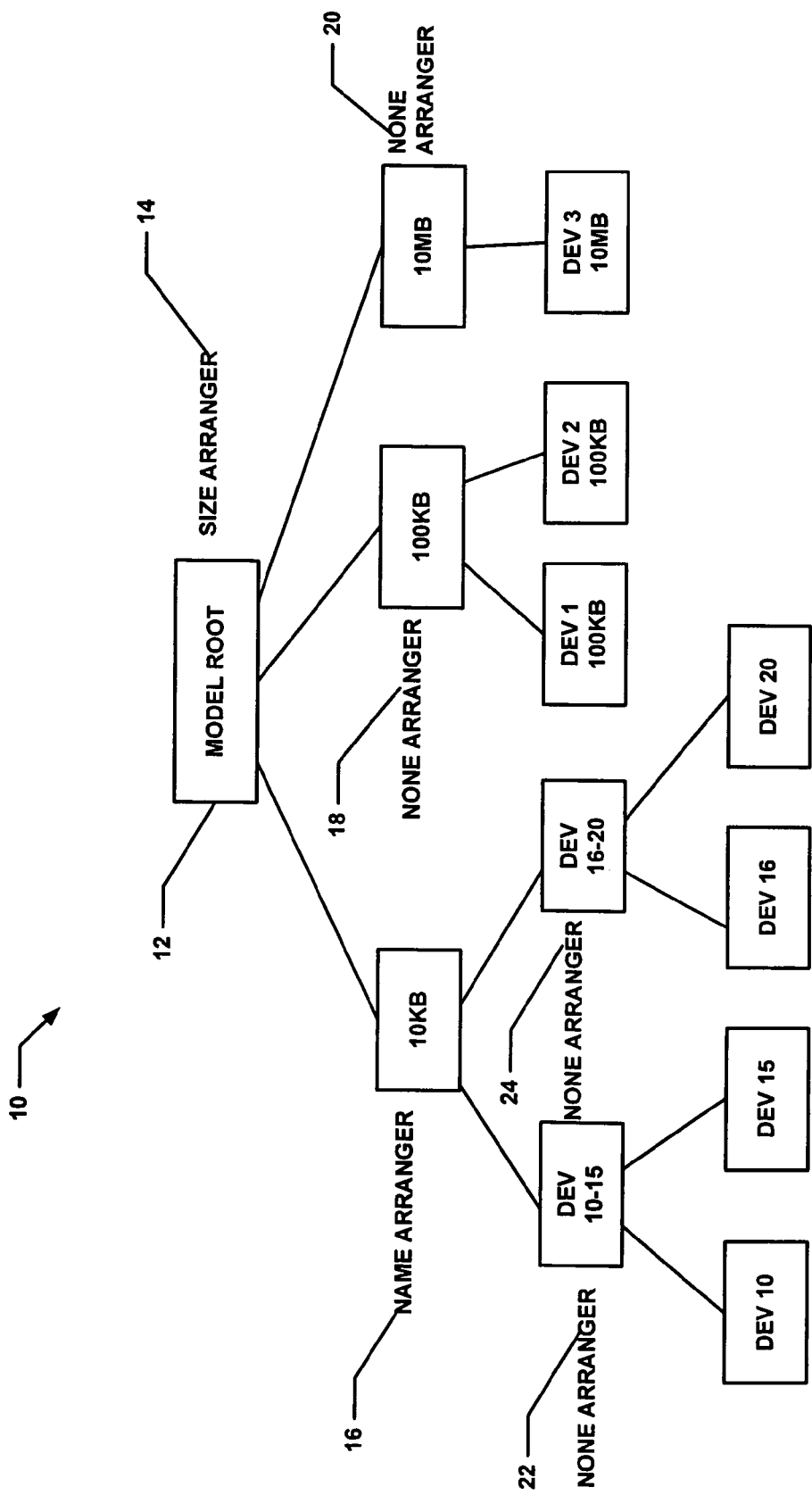
FIG. 1 depicts a block diagram example of a user-defined tree style presentation model showing concepts of the present invention.

Referring now to FIG. 1, a block diagram of a resulting tree style presentation model (or simply "tree") 10 is shown. The tree 10 and begins with a model root 12. In this example, a size arranger 14 is applied in the model root node 12 resulting in three nodes at a first level of the tree. These nodes include a 10 KB node, a 100 KB node and a 10 MB node. Under the model root, according to the size arranger, there are 10 KB devices, 100 KB devices and 10 MB devices.

The name arranger 16 is applied to the 10 KB node, resulting in two sub nodes at another level of the tree node. The two sub nodes are DEV 10-15 and DEV 16-20. The none arranger 18 is applied to the 100 KB node since there are simply two devices in this node, represented as leaf nodes DEV 1 and DEV 2 at the next level of the tree. Similarly, the none arranger is applied to node 10 MB resulting in a single device represented as leaf node DEV 3.

The none arranger has also been applied to nodes DEV 10-15 and DEV 16-20 resulting in individual leaf nodes DEV 10 through DEV 15 under node DEV 10-15 and leaf nodes DEV 16 through DEV 20 under node DEV 16-20.

Thus the entire collection of objects or devices has been modeled as a tree structure having various levels, wherein each level can be arranged according to the user desired criteria. In this example, the first level of the tree has been arranged by size, while remaining levels are arranged by name. While size and name arrangers are shown, it should be appreciated that other arrangers could also be used. Further, while storage devices are shown as the devices being modeled, it should be appreciated that other devices or objects could also be modeled using the concepts of the present invention. Additionally, while the determination of nodes is done automatically based on the devices for the selected criteria, (e.g., there were three different sizes of devices so one node per device size was placed in the tree structure) various manually selected node types or ranges could also be used. For example, the size arranger applied to the model root could have resulted in one node for devices ranging from 1-10 KB and one node for devices ranging from 100 KB-10 MB.

Figure 2:
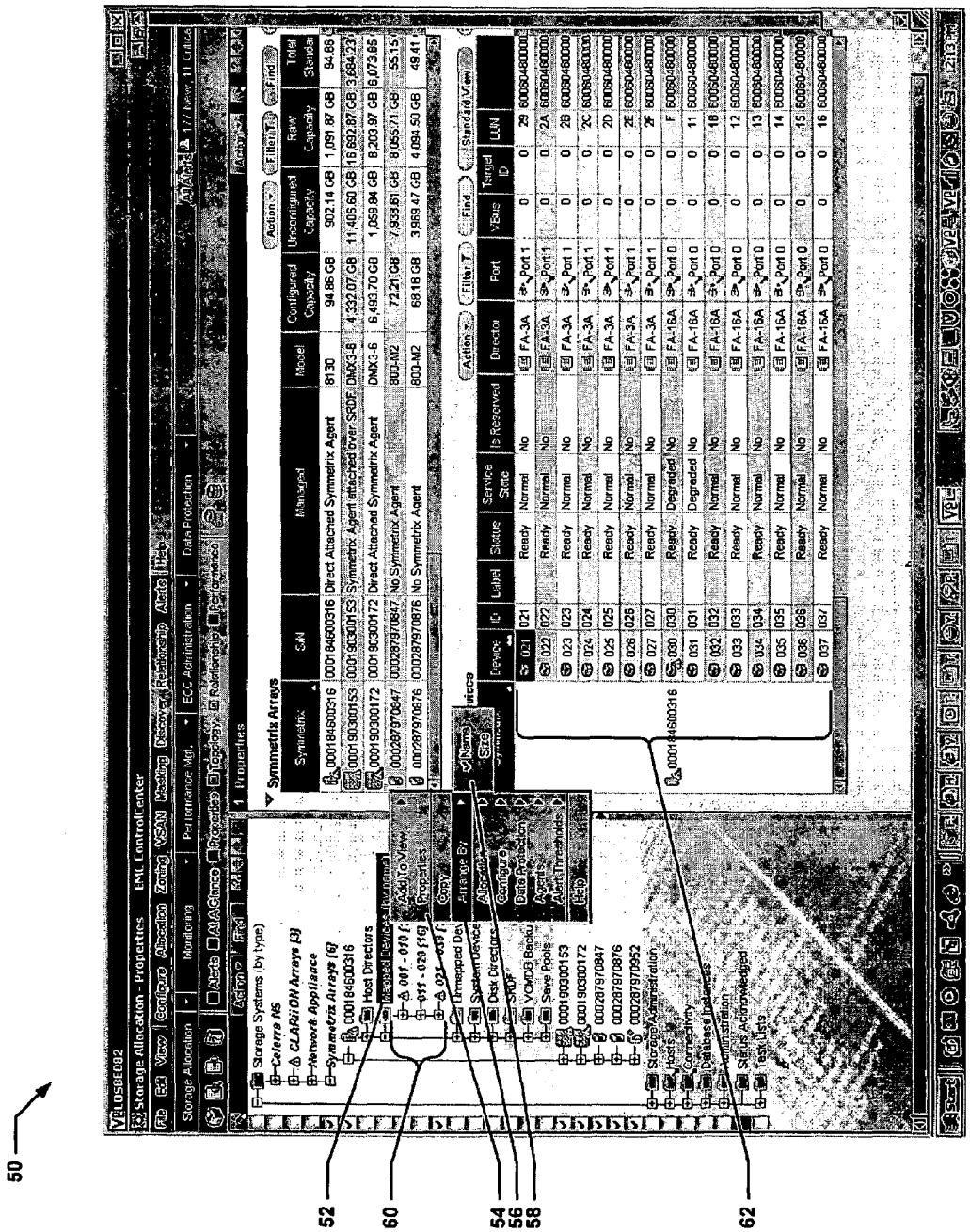
FIG. 2 shows a screen shot of a particular embodiment of a method and apparatus for displaying objects at a first level of a tree style presentation model in accordance with embodiments of the present invention.
Figure 3:
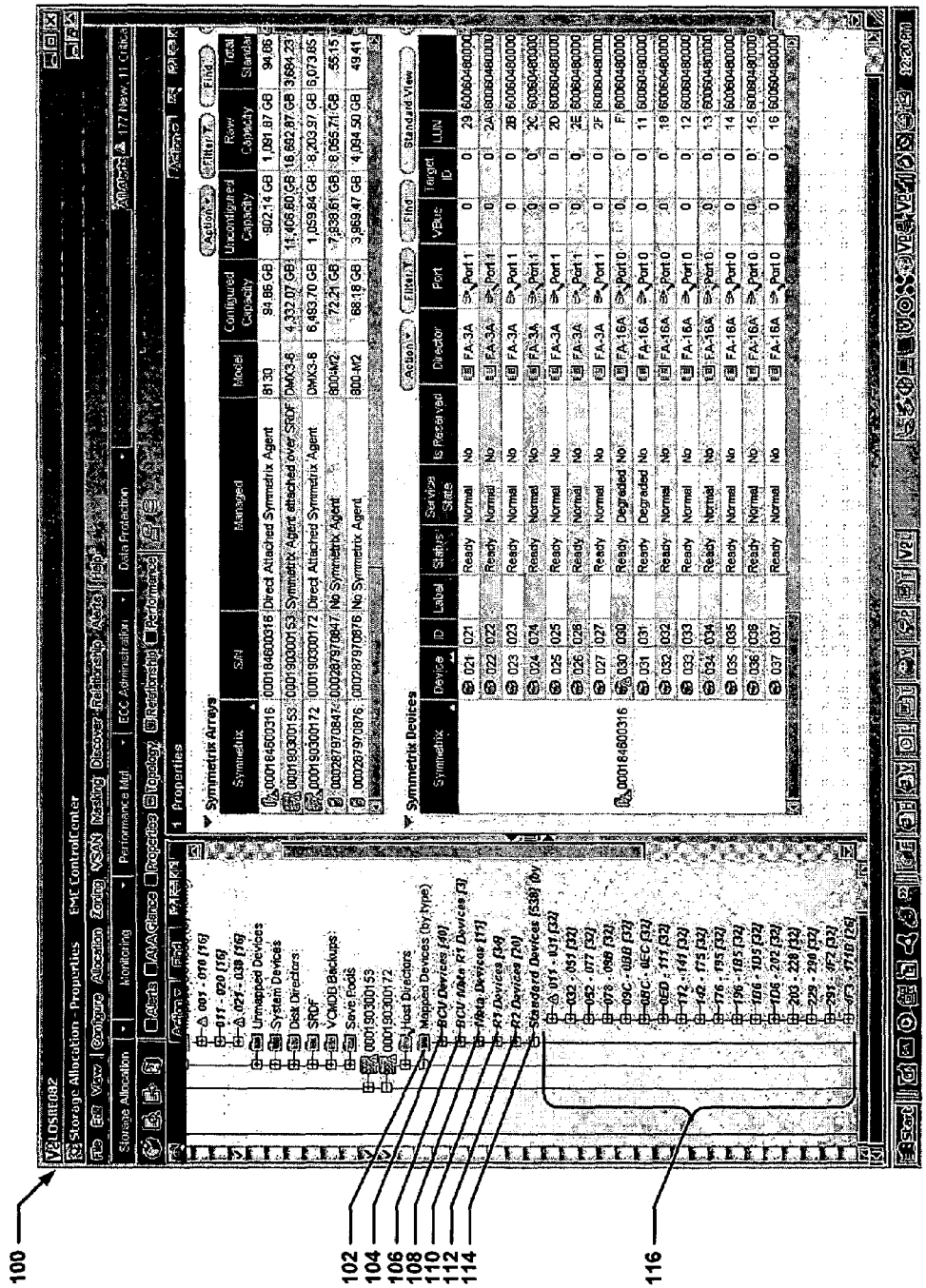
FIG. 3 shows a screen shot of a particular embodiment of a method and apparatus for displaying objects at a first level and a second level of a tree style presentation model in accordance with embodiments of the present invention.

Referring now to FIGS. 2-4, a particular example of the present invention used to manage storage devices as part of a SAN is shown. In screen shot 50, the storage system includes mapped devices, as shown by folder 52. The user has right-clicked on the mapped devices folder 52, resulting in pop-up window menu 54, which displays the various options available to the user as menu elements. The menu elements include "Add to View", "Properties", "Copy", "Arrange By", "Allocation", "Configure", "Data Protection", "Agents", "Alert Thresholds" and "Help". The user has selected the "Arrange By" menu element 56. This results in an Arranger menu pop-up window 58. The available selections for this are "Name" and "Size". The user has selected the "Name" IArranger for the first level of mapped devices. This results in the listings of group of devices by name, as indicated by reference designator 60. The first group at this level of the tree is devices 001-010 (sixteen devices, as the numbers are hexadecimal). The second group of the level of the tree is devices 011-020 (also sixteen devices) while the third group is devices 021-38 (also sixteen devices). The display area 62 of the screen shot shows more detailed information on devices 21-28.

Referring now to FIG. 3, a screen shot 100 of a more developed tree style presentation model is shown. The model root is "Mapped Devices" which have arranged by "Type". This has resulted in six different device types" BCV Devices, BCV Meta R1 Devices, Meta Devices, R1 devices, R2 devices and Standard devices, of which there are 538 devices. The 538 Standard devices have been arranged by Device Name, to produce a listing of 17 groups of devices. Each group includes 32 devices, except for the last group which contains 26 devices. The user has thus been able to display the tree of devices, first arranged by device type, then by arranging a particular device type by device name in order to produce a much more manageable listing of devices.

In a particular embodiment, the IArrangeable model sits on top of and acts as an extension to the Monitored Objects (MO) model used in the console of a SAN managing application. The MO model is the one that stores the presentation objects and stores the relation of one object to the other. For large number of presentation objects, the IArrangeable model acts as an extension, providing customized grouping as required by the user, for better tree navigation. When an event on the MO arrives, the IArrangeable model picks it up and tries to relocate the MO into an appropriate group within the tree. It first does this by walking up the current ancestor hierarchy (which is made up of various groups) of the MO and identifying the ancestor group which can still hold the MO. Of all the ancestors the model root is guaranteed to hold the MO. This check, whether each ancestor group can hold the MO is again performed by the IArranger, which the group belongs to. Once a suitable ancestor group is identified, walking down the tree, each of the group's children are checked for and one that can hold the MO is identified. Next, the child group's children are checked. This goes on recursively until a group with only leaf nodes is reached. The MO is placed into this group. Finally, the group attributes, especially the name and contained object count, is updated by the IArranger to reflect the new addition. Finally, the titles of the modified groups are updated using their respective IArranger. Referring back to FIG. 1, when the name of Dev16 of Group "10 Kb->Dev16-20" changes to Dev11, the common ancestor is the group 10 Kb. The new group is "Dev10-15".

A flow chart of the presently disclosed method of presenting objects in an arranged fashion is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4A:
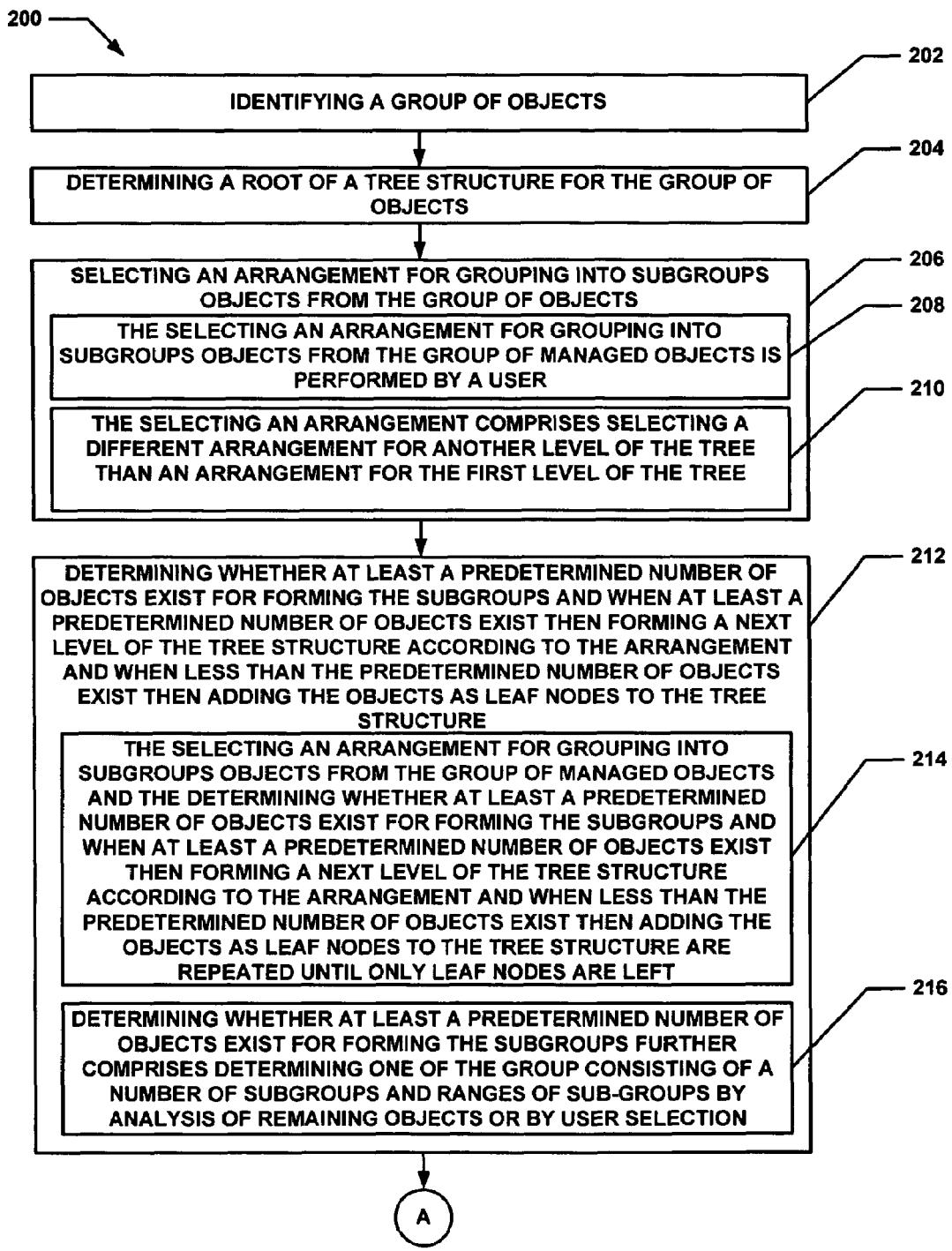
FIGS. 4A and 4B show a flow diagram of a particular embodiment of a method of presenting objects in an arranged fashion.
Figure 4B:
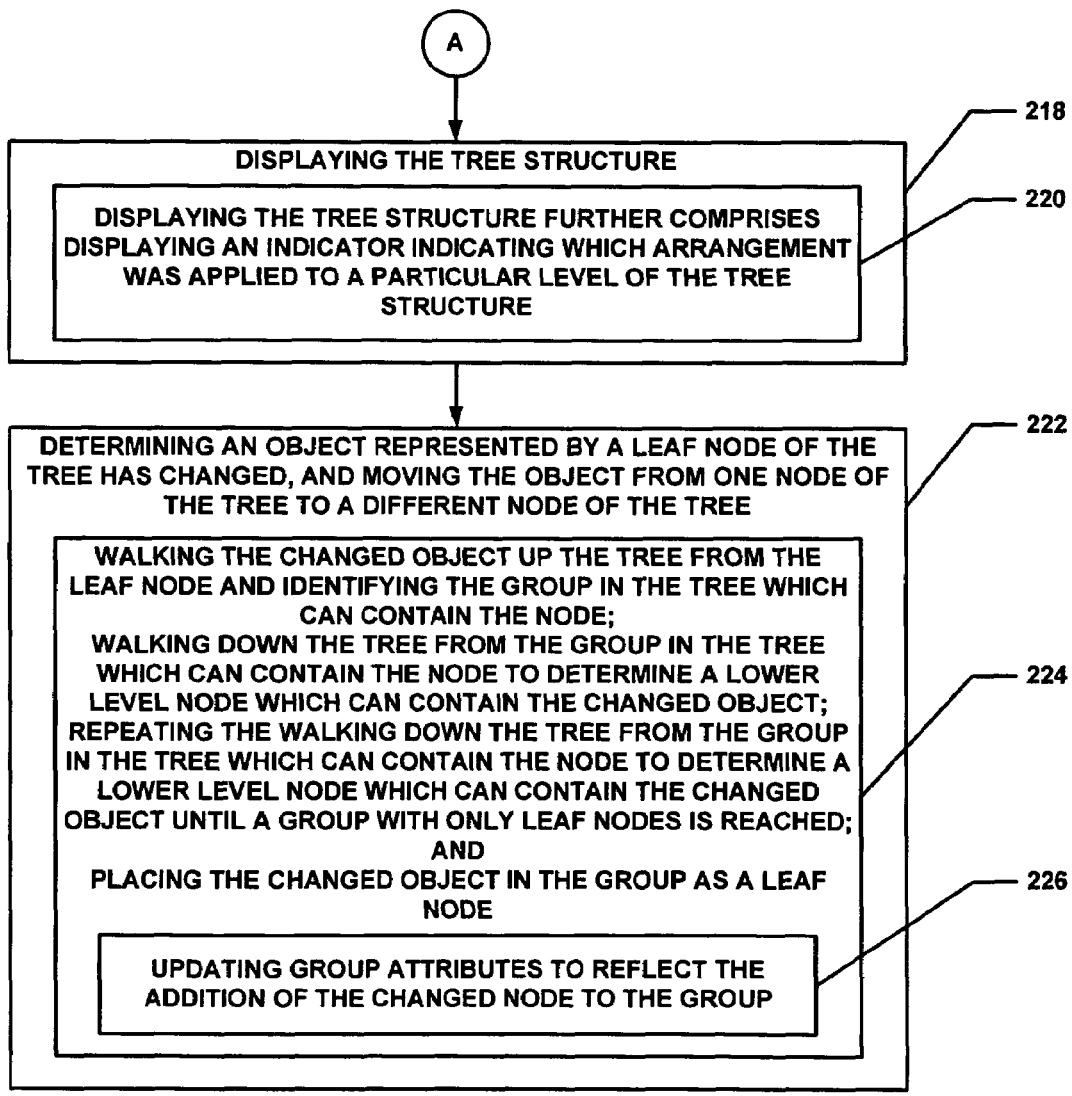

Referring now to FIGS. 4A and 4B, a method 200 of presenting objects in an arranged fashion is shown. The method begins with processing block 202 which discloses identifying a group of objects. The group of objects are the objects which will be arranged in a tree style presentation model under the direction of the user.

Processing block 204 states determining a root of a tree structure for the group of objects. The root is the model root, from which the first level of the tree structure will depend.

Processing block 206 recites selecting an arrangement for grouping into subgroups certain objects from the group of objects. Processing block 208 discloses the selecting an arrangement for grouping into subgroups certain objects from the group of objects is performed by a user. Thus, the user selects an arranger (e.g. a size arranger, a type arranger, etc.) to display the grouping of objects in the desired arrangement. As further recited in processing block 210 a different arrangement can be selected for another level of the tree than an arrangement for the first level of the tree. The different tree levels can be arranged according to the criteria desired by the user.

Processing continues at processing block 212 which states determining whether at least a predetermined number of objects exist for forming the subgroups and when at least a predetermined number of objects exist then forming a next level of the tree structure according to the arrangement and when less than the predetermined number of objects exist then adding the objects as leaf nodes to the tree structure. Processing block 214 discloses that the selecting an arrangement of processing block 206 and the action of processing block 212 are repeated until only leaf nodes are left. Stated differently, the process is repeated until an entire tree structure including all the objects is built. Processing block 216 states determining whether at least a predetermined number of objects exist for forming the subgroups further comprises determining one of the group consisting of a number of sub-groups and ranges of sub-groups by analysis of remaining objects or by user selection. The sub-group determination can be performed by the software process or can be determined by user input.

Processing block 218 recites displaying the tree structure. Once the tree structure has been built, it is displayed to the user, typically as part of a Graphical User Interface (GUI). Processing block 220 discloses displaying an indicator indicating which arrangement was applied to a particular level of the tree structure. The user can easily determine which arranger was selected at which level of the tree structure to provide the arrangement for the level of the tree structure.

Processing block 222 states determining an object represented by a leaf node of the tree has changed, and moving the object from one node of the tree to a different node of the tree. This takes into account a situation wherein an object has somehow been modified (e.g., renamed). Processing block 224 recites walking the changed object up the tree from the leaf node and identifying the group in the tree which can contain the node. It first does this by walking up the current ancestor hierarchy (which is made up of various groups) of the object and identifying the ancestor group which can still hold the object. Of all the ancestors the model root is guaranteed to hold the object. This check, whether each ancestor group can hold the MO is again performed by the IArranger, which the group belongs to. Processing block 224 further recites walking down the tree from the group in the tree which can contain the node to determine a lower level node which can contain the changed object, repeating the walking down the tree from the group in the tree which can contain the node to determine a lower level node which can contain the changed object until a group with only leaf nodes is reached, and placing the changed object in the group as a leaf node. Once a suitable ancestor group is identified, walking down the tree, each of the group's children are checked for and one that can hold the MO is identified. Next, the child group's children are checked. This goes on recursively until a group with only leaf nodes is reached. The object is placed into this group. Processing block 226 recites updating group attributes to reflect the addition of the changed node to the group. The group attributes, especially the name and contained object count, is updated by the IArranger to reflect the new addition. Finally, the titles of the modified groups are updated using their respective IArranger.

Figure 5:
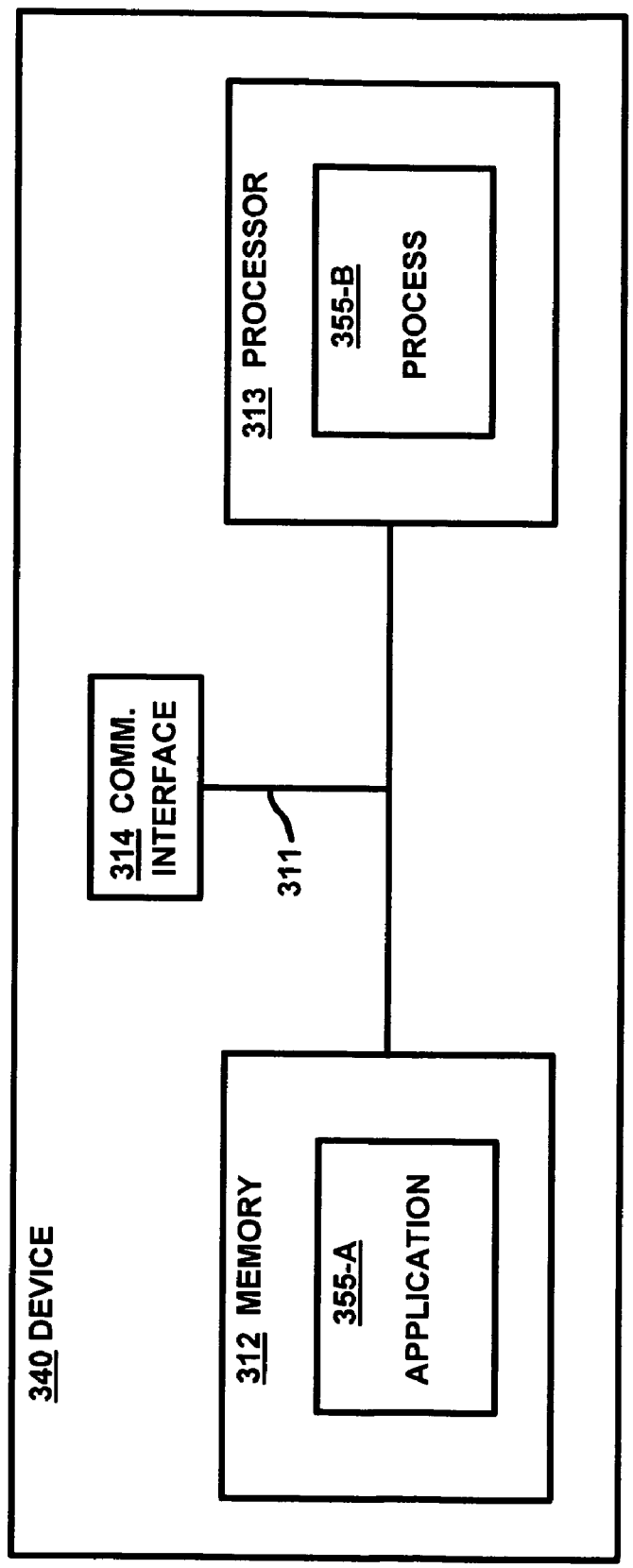
FIG. 5 illustrates an example computer system architecture for a computer system that presents objects in an arranged fashion in accordance with embodiments of the invention.

FIG. 5 illustrates example architectures of a computer system that is configured as a host computer system 340. The computer system 340 may be any type of computerized system such as a personal computer, workstation, portable computing device, mainframe, server or the like. In this example, the system includes an interconnection mechanism 311 that couples a memory system 312, a processor 313, and a communications interface 314. The communications interface 314 allows the computer system 340 to communicate with external devices or systems.

The memory system 312 may be any type of computer readable medium that is encoded with an application 355-A that represents software code such as data and/or logic instructions (e.g., stored in the memory or on another computer readable medium such as a disk) that embody the processing functionality of embodiments of the invention. The processor 313 can access the memory system 312 via the interconnection mechanism 311 in order to launch, run, execute, interpret or otherwise perform the logic instructions of the applications 355-A for the host in order to produce a corresponding process 355-B. In other words, the process 355-B represents one or more portions of the application 355-A performing within or upon the processor 313 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 312 (e.g., within random access memory or RAM). It is also to be understood that other embodiments of the invention can provide the applications operating within the processor 313 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method of presenting objects in an arranged fashion in which a computer system performs operations comprising:
    identifying a group of objects at the computer system, each object comprises a storage device in a storage area network;
    determining a root of a tree structure for said group of objects;
    for each level of the tree structure, selecting from a plurality of arrangements for grouping objects into subgroups, each arrangement comprising a user-selected arrangement criteria based on a storage device attribute, each user-selected arrangement criteria corresponding to a specific level of the tree structure;
    from a current level of the tree structure, upon determining at least a predetermined number of objects exist for forming at least one subgroup at a next level, forming the subgroup at the next level according to a user-selected arrangement criteria that a user has associated with the next level;
    when less than the predetermined number of objects exist, placing said objects within said tree structure as respective individual leaf nodes displayed according to the user-selected arrangement criteria corresponding to the next level;
    repeating the steps of selecting from the plurality of arrangements and determining at least the predetermined number of objects exist with respect to each level of the tree structure until only leaf nodes are left at a final level of the tree structure; and
    displaying said tree structure.

2. The method of claim 1 wherein said selecting an arrangement for grouping into subgroups objects from said group of objects is performed by a user.

3. The method of claim 1 further comprising determining an object represented by a leaf node of said tree has changed, and moving said object from one node of said tree to a different node of said tree.

4. The method of claim 3 wherein said moving said changed object from one node of said tree to a different node of said tree comprises:
    walking said changed object up said tree from said leaf node and identifying the group in said tree which can contain said node;

walking down said tree from said group in said tree which can contain said node to determine a lower level node which can contain said changed object;

repeating said walking down said tree from said group in said tree which can contain said node to determine a lower level node which can contain said changed object until a group with only leaf nodes is reached; and placing said changed object in said group as a leaf node.

5. The method of claim 4 further comprising updating group attributes to reflect the addition of the changed node to said group.

6. The method of claim 1 wherein said displaying said tree structure further comprises displaying an indicator indicating which arrangement was applied to a particular level of said tree structure.

7. The method of claim 1 wherein determining whether at least a predetermined number of objects exist for forming said subgroups further comprises determining one of the group consisting of a number of subgroups and ranges of subgroups by analysis of remaining objects.

8. The method of claim 1 wherein determining whether at least a predetermined number of objects exist for forming said subgroups further comprises determining one of the group consisting of a number of subgroups and ranges of subgroups by user selection.

9. The method as in claim 1, wherein forming the next level of said tree structure includes:

forming at least one subgroup of storage devices at a first level of the tree structure according to a first user-selected arrangement criteria that corresponds to the first level, the first user-selected arrangement criteria based on at least one storage device size.

10. The method as in claim 9, wherein forming at least one subgroup of objects includes:

forming a first subgroup at the first level of the tree structure, the first subgroup including at least one storage device having a storage device size that falls within a first range of sizes; and forming a second subgroup at the first level of the tree structure, the second subgroup including at least one storage device having a storage device size that falls within a second range of sizes, the minimum storage device size of the second range of sizes comprises a larger size than a maximum storage device size of the first range of sizes.

11. The method as in claim 10, comprising:

upon determining less than the predetermined number of storage devices exist to form at least one subgroup of storage devices at a second level of the tree structure, placing storage devices at the second level as respective leaf nodes, the second level deeper than the first level in the tree structure, each leaf node arranged in the tree structure according to a second user-selected arrangement criteria, the second user-selected arrangement criteria based on at least one storage device name.

12. The method as in claim 11, wherein placing objects at the second level as respective leaf nodes includes:

connecting a first leaf node at the second level to the first subgroup at the first level, the first leaf node representing a name of an individual storage device having a size that falls within the first range of sizes associated with the first subgroup; and connecting a second leaf node at the second level to the second subgroup at the first level, the second leaf node representing a name of an individual storage device having a size that falls within the second range of sizes associated with the second subgroup.

13. A physical computer readable medium having computer readable code thereon for presenting objects in an arranged fashion, the medium comprising:

instructions for identifying a group of objects, each object comprises a storage device in a storage area network;

instructions for determining a root of a tree structure for said group of objects;

instructions for selecting from a plurality of arrangements for grouping objects into subgroups at each level of the tree structure, each arrangement comprising a user-selected arrangement criteria based on a storage device attribute, each user-selected arrangement criteria corresponding to a specific level of the tree structure;

instructions for forming at least one subgroup at a next level of said tree structure from a current level of the tree structure according to a user-selected arrangement criteria that a user has associated with the next level upon determining at least a predetermined number of objects exist for forming at least one subgroup at the next level;

instructions for placing said objects within said tree structure as respective individual leaf nodes displayed according to the user-selected arrangement criteria corresponding to the next level when less than the predetermined number of objects exist;

instructions for repeating the steps of selecting from the plurality of arrangements and determining at least the predetermined number of objects exist with respect to each level of the tree structure until only leaf nodes are left at a final level of the tree structure; and instructions for displaying said tree structure.

14. The computer readable medium of claim 13 wherein said selecting an arrangement for grouping into subgroups objects from said group of objects is performed by a user.

15. The computer readable medium of claim 13 further comprising instructions for determining an object represented by a leaf node of said tree has changed, and instructions for moving said object from one node of said tree to a different node of said tree.

16. The computer readable medium of claim 15 wherein said instructions for moving said changed object from one node of said tree to a different node of said tree comprises:

instructions for walking said changed object up said tree from said leaf node and identifying the group in said tree which can contain said node;

instructions for walking down said tree from said group in said tree which can contain said node to determine a lower level node which can contain said changed object;

instructions for repeating said walking down said tree from said group in said tree which can contain said node to determine a lower level node which can contain said changed object until a group with only leaf nodes is reached; and instructions for placing said changed object in said group as a leaf node.

17. The computer readable medium of claim 16 further comprising instructions for updating group attributes to reflect the addition of the changed node to said group.

18. The computer readable medium of claim 13 wherein said instructions for determining whether at least a predetermined number of objects exist for forming said subgroups further comprises instructions for determining one of the group consisting of a number of subgroups and ranges of sub-groups by analysis of remaining objects.

19. The computer readable medium of claim 13 wherein said instructions for determining whether at least a predetermined number of objects exist for forming said subgroups further comprises instructions for determining one of the group consisting of a number of subgroups and ranges of sub-groups by user selection.

* * * * *